United States Patent
Huang

(10) Patent No.: US 9,250,396 B2
(45) Date of Patent: Feb. 2, 2016

(54) OPTICAL COUPLING DEVICE

(71) Applicant: HON HAI PRECISION INDUSTRY CO., LTD., New Taipei (TW)

(72) Inventor: Po-Wei Huang, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 14/539,251

(22) Filed: Nov. 12, 2014

(65) Prior Publication Data

US 2015/0153517 A1 Jun. 4, 2015

(30) Foreign Application Priority Data

Nov. 29, 2013 (TW) .............................. 102143941 A

(51) Int. Cl.
*G02B 6/36* (2006.01)
*G02B 6/38* (2006.01)

(52) U.S. Cl.
CPC .............. *G02B 6/3873* (2013.01); *G02B 6/389* (2013.01); *G02B 6/3839* (2013.01); *G02B 6/3853* (2013.01); *G02B 6/3885* (2013.01)

(58) Field of Classification Search
None
See application file for complete search history.

(56) References Cited

U.S. PATENT DOCUMENTS

| 2011/0085771 A1* | 4/2011 | Matsuyama | G02B 6/43 385/125 |
| 2015/0036980 A1* | 2/2015 | Li | G02B 6/3826 385/81 |

* cited by examiner

*Primary Examiner* — Hemang Sanghavi
(74) *Attorney, Agent, or Firm* — Novak Druce Connolly Bove + Quigg LLP

(57) ABSTRACT

An optical coupling device includes a first and a second body. The first body receives first optical fibers. The first body has a first body optical surface and a first body partial top surface. First lenses are positioned on the first body optical surface. The second body receives second optical fibers. The second body has a second body optical surface and a second body partial top surface. Second lenses are positioned on the second body optical surface. Flexible connecting members connect the first body optical surface to the second body optical surface. When the coupling device is in a closed position, the first body partial top surface is in substantial contact with the second body partial top surface. When the coupling device is in an open position, the first body optical surface is opposite to the second body optical surface aligning the first lenses with the second lenses.

18 Claims, 3 Drawing Sheets

OPTICAL COUPLING DEVICE

FIELD

The present disclosure relates to optical data transmission.

BACKGROUND

An optical coupling device usually includes two optical connectors. The two optical connectors may be connected by inserting rods of one of the optical connectors into holes of the other optical connectors and this arrangement can govern optical alignment between the connectors.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
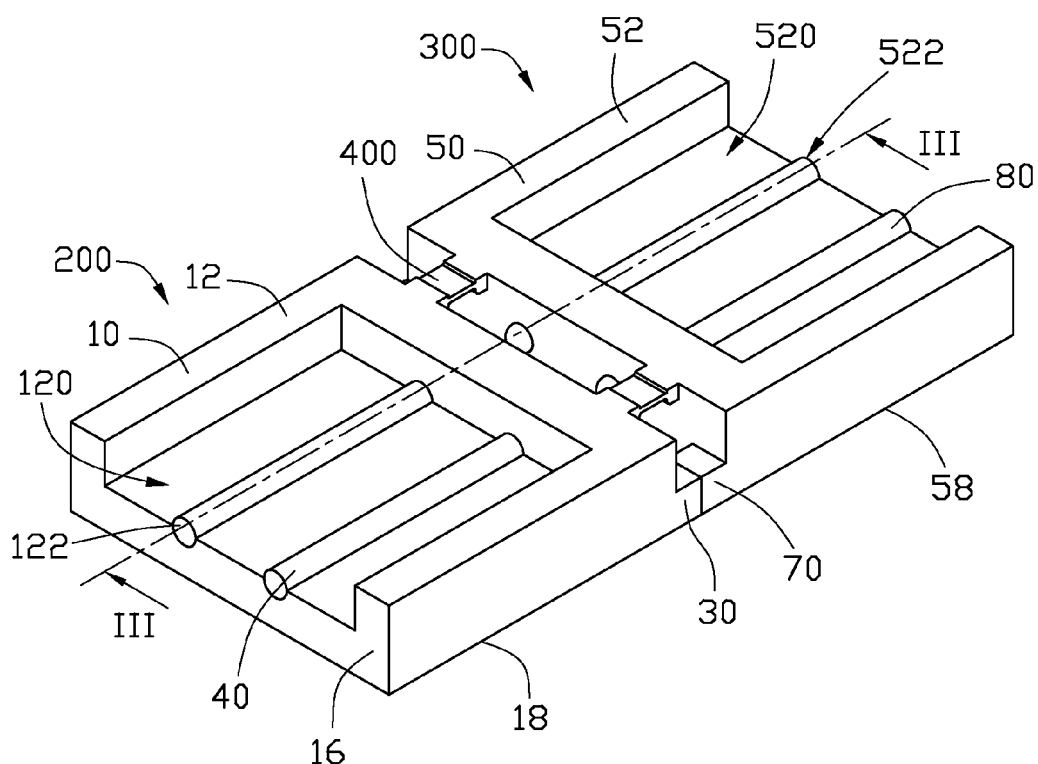
FIG. 1 is a isometric view of an optical coupling device in an open state according to an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series, and the like.

The present disclosure is described in relation to an optical coupling device.

Figure 2:
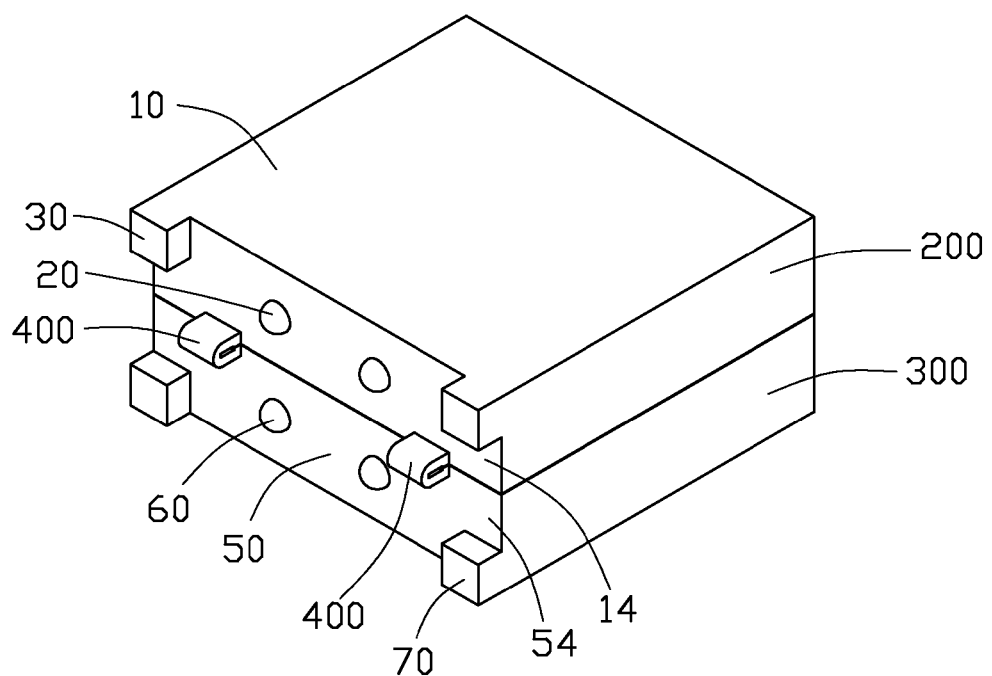
FIG. 2 is a isometric view of the optical coupling device of FIG. 1 in a closed state.

FIGS. 1 and 2 show an optical coupling device 100. The optical coupling device 100 includes a first optical connector 200 and a second optical connector 300 connected by two connecting members 400. The optical coupling device 100 is made of plastic, such as polyetherimide (PEI).

The first optical connector 200 includes a first body 10, two first lenses 20, and two first resisting parts 30. The first optical connector 200 receives and holds two first optical fibers 40.

The first body 10 includes a first top surface 12, a first optical surface 14, a first back surface 16, and a first bottom surface 18. The first top surface 12 is opposite to and parallel to the first bottom surface 18. The first optical surface 14 and the first back surface 16 are perpendicularly connected to the first top surface 12 and the first bottom surface 18. The first body 10 defines a first receiving space 120 extending through the first back surface 16 and the first top surface 12, and two first receiving grooves 122 are defined at the bottom of the first receiving space 120 and communicate with the first receiving space 120. The two first receiving grooves 122 receive and hold the two first optical fibers 40. Each first optical fiber 40 includes a first light emitting surface 42.

The two first lenses 20 are arranged on the first optical surface 14 and each is aligned with a first receiving groove 122. In this embodiment, the first lenses 20 are convex lenses and focal points of the first lenses 20 are located on the first light emitting surfaces 42 of the first optical fibers 40.

The two first resisting members 30 project from opposite sides of the first optical surface 14. The two first resisting members 30 are square-shaped blocks.

The second optical connector 300 includes a second body 50, two second lenses 60, and two second resisting parts 70. The second optical connector 300 receives and holds two second optical fibers 80.

The second body 50 includes a second top surface 52, a second optical surface 54, a second back surface 56, and a second bottom surface 58. The second top surface 52 is opposite to and parallel to the second bottom surface 58. The second optical surface 54 and the second back surface 56 are perpendicularly connected to the second top surface 52 and the second bottom surface 58. The second body 50 defines a second receiving space 520 extending through the second back surface 56 and the second top surface 52, and two second receiving grooves 522 defined at the bottom of the second receiving space 520 and communicating with the second receiving space 520. The two second receiving grooves 522 receive and hold the two second optical fibers 80. Each second optical fiber 80 includes a second light emitting surface 82.

The two second lenses 60 are arranged on the second optical surface 54 and each is aligned with a second receiving groove 522. In this embodiment, the second lenses 60 are convex lenses and focal points of the second lenses 60 are located on the second light emitting surfaces 82 of the second optical fibers 80.

The two second resisting members 70 project from opposite sides of the second optical surface 54. The two second resisting members 70 are square-shaped blocks.

Figure 3:
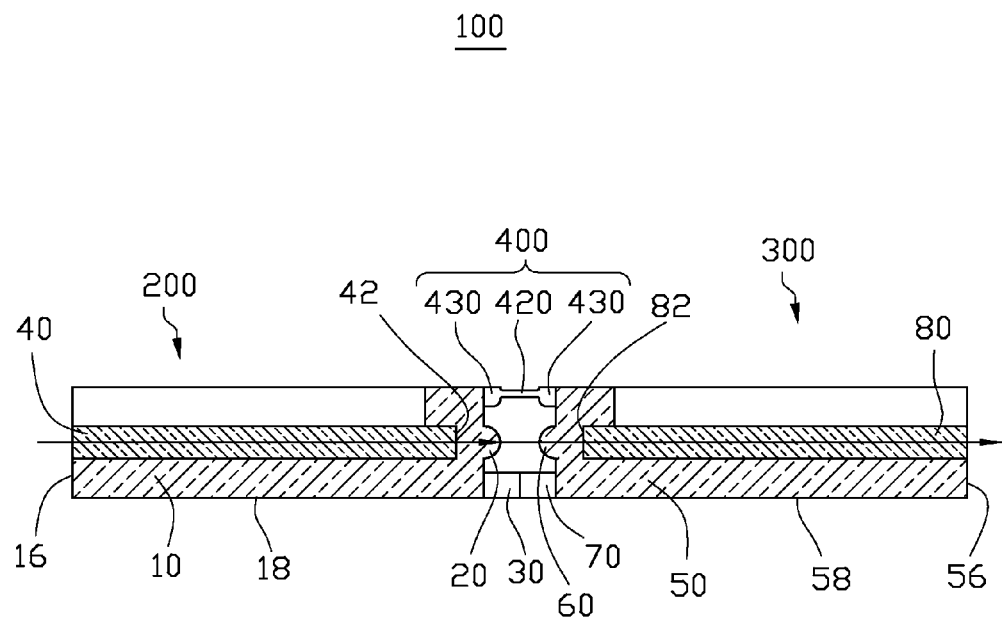
FIG. 3 is a cross-sectional view taken along line III-III of FIG. 1.

One end of each connecting member 400 is fixed on the first optical surface 14 and is adjacent to the first top surface 12. The other end of each connecting member 400 is fixed on the second optical surface 54 and is adjacent to the second top surface 52. The connecting members 400 are flexible. FIG. 3 shows that the connecting member 400 is "I" shaped, and includes one strip part 420 and two bulging parts 430, the bulging parts 430 being directly connected to the first optical connector 200 and the second optical connector 300. A thickness of the strip part 420 is less than that of the bulging parts 430.

As shown in FIG. 2, when the connecting members 400 are bent, the first body 10 and the second body 50 are then stacked, the first top surface 12 contacting the second top surface 52.

As shown in FIG. 1, when the connecting members 400 are straightened, the first optical surface 14 is opposite to the second optical surface 54, the first lenses 20 are aligned with the second lenses 60, the first top surface 12 is even with the second top surface 52, and the first bottom surface 18 is even with the second bottom surface 58. The first resisting members 30 resist the second resisting members 70 for aligning the first lenses 20 with the second lenses 60 precisely. Optical signals are transmitted through the first optical fibers 40, the first lenses 20, the second lenses 60, and the second optical fibers 80 (see FIG. 3).

The optical coupling device 100 uses connecting members 400 to connect the first connecting member 200 to the second connecting member 300. The connecting members 400 are very durable, thus there will always be correct alignment between the first connecting member 200 and the second connecting member 300.

It will be understood that the above particular embodiments are shown and described by way of illustration only. The principles and the features of the present disclosure can be employed in various and numerous embodiments thereof without departing from the scope of the disclosure. The above-described embodiments illustrate the scope of the disclosure but do not restrict the scope of the disclosure.

What is claimed is:

1. An optical coupling device comprising:
   a first optical connector comprising:
      a first body comprising a first optical surface and a first top surface perpendicular to the first optical surface; and
      first lenses located on the first optical surface;
   a second optical connector comprising:
      a second body comprising a second optical surface and a second top surface perpendicular to the second optical surface; and
      second lenses located on the second optical surface; and
      at least one flexible connecting member connecting the first optical surface to the second optical surface, wherein when the connecting member is bent, the first top surface contacts the second top surface, and when the connecting member is straightened, the first optical surface is opposite to the second optical surface and the first lenses are aligned with the second lenses.

2. The optical coupling device of claim 1, wherein the connecting member is I shaped, comprises a strip part and two bulging part connected between the strip part and the first and second optical surfaces.

3. The optical coupling device of claim 1, wherein one end of the connecting member is adjacent to the first top surface, and the other end of the connecting member is adjacent to the second top surface.

4. The optical coupling device of claim 1, wherein the first optical connector further comprises at least one first resisting member projecting from the first optical surface, and the second optical connector further comprises at least one second resisting member projecting from the second optical surface, when the connecting member is straightened, the first resisting member resists the second resisting member.

5. The optical coupling device of claim 4, wherein the first and second resisting members are blocks.

6. The optical coupling device of claim 1, wherein the first body comprises a first back surface opposite to the first optical surface and perpendicular to the first top surface, the first body defines a first receiving space extending through the first top surface and the first back surface, and first receiving grooves located at the bottom of the first receiving space and communicated with the first receiving space, the first receiving grooves are configured for receiving first optical fibers.

7. The optical coupling device of claim 6, wherein the first optical fibers comprise first light emitting surfaces, and focal points of the first lenses are located on the first light emitting surfaces.

8. The optical coupling device of claim 1, wherein the second body comprises a second back surface opposite to the second optical surface and perpendicular to the second top surface, the second body defines a second receiving space extending through the second top surface and the second back surface, and second receiving grooves located at the bottom of the second receiving space and communicated with the second receiving space, the second receiving grooves are configured for receiving second optical fibers.

9. The optical coupling device of claim 6, wherein the second optical fibers comprise second light emitting surfaces, and focal points of the second lenses are located on the second light emitting surfaces.

10. An optical coupling device comprising:
    a first body for receiving one or more first optical fibers, the first body having a first body optical surface and a first body partial top surface substantially perpendicular to the first body optical surface;
    one or more first lenses positioned on the first body optical surface;
    a second body for receiving one or more second optical fibers, the second body having a second body optical surface and a second body partial top surface substantially perpendicular to the second body optical surface;
    one or more second lenses positioned on the second body optical surface; and
    one or more flexible connecting members connecting the first body optical surface to the second body optical surface;
    wherein, when the coupling device is in a closed position, the first body partial top surface is in substantial contact with the second body partial top surface; and
    wherein, when the coupling device is in an open position, the first body optical surface is opposite to the second body optical surface aligning each of the one or more first lenses with one of the one or more second lenses.

11. The optical coupling device of claim 10, wherein the connecting member is I shaped, comprises a strip part and two bulging part connected between the strip part and the first and second body optical surfaces.

12. The optical coupling device of claim 10, wherein one end of the connecting member is adjacent to the first body partial top surface, and the other end of the connecting member is adjacent to the second body partial top surface.

13. The optical coupling device of claim 10, wherein the first optical connector further comprises at least one first resisting member projecting from the first body optical surface, and the second optical connector further comprises at least one second resisting member projecting from the second body optical surface, when the connecting member is straightened, the first resisting member resists the second resisting member.

14. The optical coupling device of claim 13, wherein the first and second resisting members are blocks.

15. The optical coupling device of claim 10, wherein the first body comprises a first back surface opposite to the first body optical surface and perpendicular to the first body partial top surface, the first body defines a first receiving space extending through the first body partial top surface and the first back surface, and first receiving grooves located at the bottom of the first receiving space and communicated with the first receiving space, the first receiving grooves are configured for receiving first optical fibers.

16. The optical coupling device of claim 15, wherein the first optical fibers comprise first light emitting surfaces, and focal points of the first lenses are located on the first light emitting surfaces.

17. The optical coupling device of claim 10, wherein the second body comprises a second back surface opposite to the second body optical surface and perpendicular to the second body partial top surface, the second body defines a second receiving space extending through the second body partial top surface and the second back surface, and second receiving grooves located at the bottom of the second receiving space and communicated with the second receiving space, the second receiving grooves are configured for receiving second optical fibers.

18. The optical coupling device of claim 15, wherein the second optical fibers comprise second light emitting surfaces, and focal points of the second lenses are located on the second light emitting surfaces.

* * * * *